May 23, 1950  G. CONSALVO  2,508,495
APPARATUS FOR EXTRUDING PLASTIC MATERIALS
Filed June 17, 1948
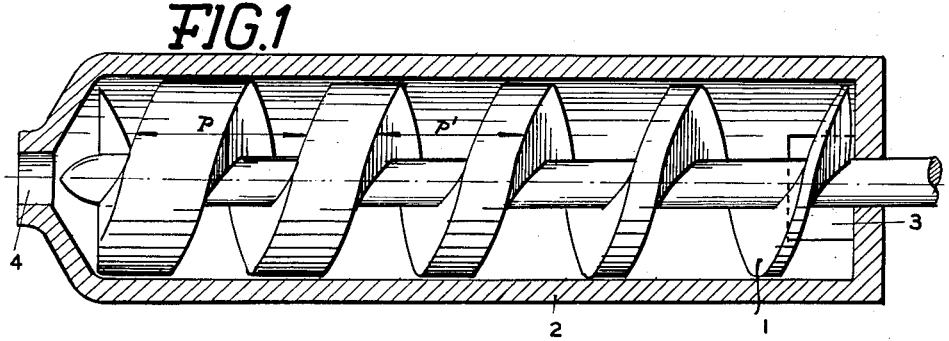
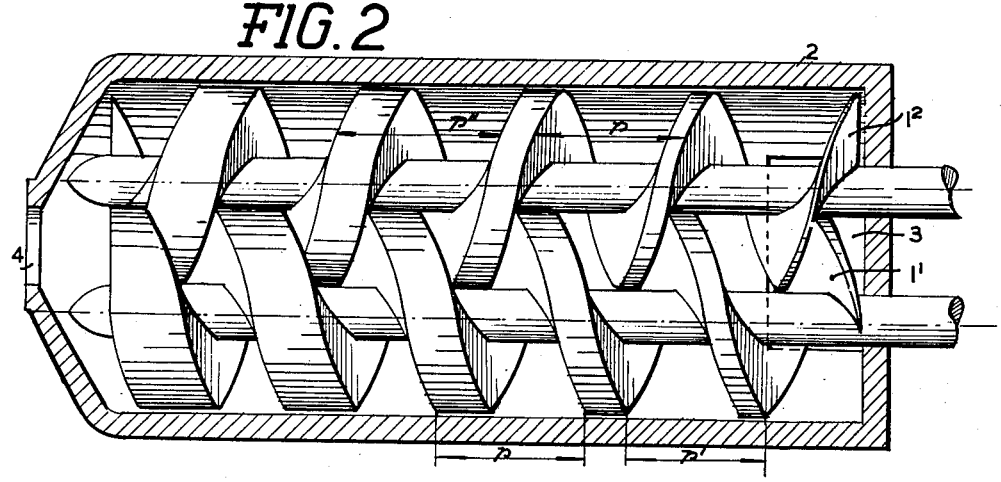
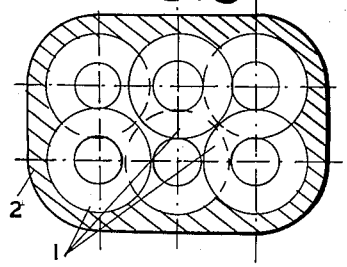
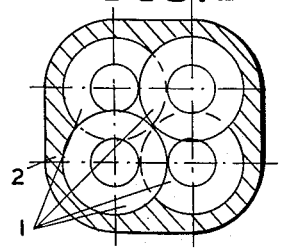
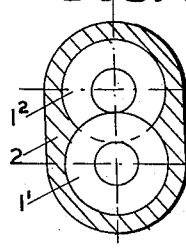
INVENTOR
Gabriel Consalvo.
ATTORNEY.

Patented May 23, 1950

2,508,495

UNITED STATES PATENT OFFICE 2,508,495

APPARATUS FOR EXTRUDING PLASTIC MATERIALS

Gabriel Consalvo, Brussels, Belgium, assignor to Raymond Wampach, Brussels, Belgium Application June 17, 1948, Serial No. 33,618
In Belgium June 25, 1947

7 Claims. (Cl. 18—12)

The present invention relates to an extrusion process which is suitable in particular for shaping plastic and like substances, and which is characterized in that the substances to be treated are fed through an adequately heated casing, from the charging opening to the outlet opening, in a gradually decreasing space so as to subject them to gradual compression, and at the same time gradually increasing the rolling and malaxing effect.

Another characteristic of the invention consists in that the extruding device which is intended for shaping plastic or like substances comprises the member for propelling, malaxing, rolling and compressing the material, said member being adapted to rotate in a casing of suitable size and comprising at least one screw, the thread of which increases in thickness in the direction of feed of the substance inside the machine, while at the same time decreasing the volume between the threads.

It is well known that plastic substances are becoming more important from day to day, so that it is natural that technicians have made more and more endeavours to improve the processes and machines intended for the shaping of said substances.

In order to make the scope of the present invention more clearly apparent, it is pointed out that practice shows that the extruding machine called "cylinder-pressing machine" intended for shaping plastic substances, has to effect three separate operations: (a) malaxing, (b) heating, (c) compressing.

It is of the greatest advantage for it to be possible to effect these three operations in as short a time and as small a space as possible, since the longer the substance remains exposed to the action of heat, the more it changes its characteristics even up to the point of decomposing if certain limits are exceeded. The use as members for propelling the substance inside the machine, of a single screw, or of multiple screws of more or less great length, which partly engage in one another and either rotate in the same direction or in opposite directions, is known per se.

The present invention enables the substance to be extruded in a very short time and in a very small space by the combination of the various operations which are useful for such extrusion; with this end in view, the substance is made to occupy a smaller and smaller volume as it moves forwards, so that said substance is subjected to a gradual pressure; then the thread of the propelling screw, or screws, considerably increases in thickness in the direction of feed of the substance inside the machine, i. e. as the substance moves further away from the inlet and nearer to the outlet.

In the accompanying drawing, varous embodiments of the present invention are illustrated by way of example.

Fig. 1 is a diagrammatic view of the device with a single screw.

Fig. 2 shows a diagrammatic section of the extrusion device with two screws.

Figs. 3, 4 and 5 show diagrammatically transverse section of embodiments with two, four and six screws.

Fig. 1 shows diagrammatically a manner of carrying out the invention when the propelling member comprises a single screw $1$ contained in a casing $2$. The inlet of the substance is effected through the charging opening $3$, whereas the outlet is effected through the opening $4$. The pitch $p$, measured between the left-hand edges (outlet side) of the propelling screw, is greater than the pitch $p'$ measured between the right-hand edges (inlet side).

The process can be carried out either with a single propelling screw, or with a plurality of screws fitting into one another; in this case, in order to carry out the invention practically, it is necessary for the screws, taken in pairs, to be different from one another, but to be in accordance with the following general rule;

If $p$ (Fig. 2) denotes the pitch of one of the screws—the the screws $1^1$—measured between the left-hand edges of the thread (the outlet of the substance being effected on the left side of the figure), this same pitch $p$ should be the pitch for the other screw—the screw $1^2$—measured between the right-hand edges, the outlet of the substance still being on the left of the figure. The pitch $p'$ for the first screw (screw $1^1$) measured between the right-hand edges, and $p''$ for the second screw (screw $1^2$) measured between the left-hand edges, may be arbitrarily fixed provided that it remains possible to fit the two screws into one another, but $p$ must always be greater than $p'$ and smaller than $p''$. Except in special cases, the equation $p-p'=p''-p$ must be satisfied. It is obvious that the size, the number of the screws, the pitches (left-hand—left-hand, right-hand—right-hand, or left-hand—right-hand), the shape adopted for the profile of the threads and the like, may be infinitely varied without thereby exceeding the scope of the present invention.

Figs. 3, 4 and 5 show diagrammatically various possibilities for coupling.

The construction of these screws does not involve any technical difficulties; on the other hand, the advantages obtained are considerable:

(a) With the novel device, the space between the first threads of the screw is so large that whatever the shape of the substance to be worked, it is accommodated without difficulty;

(b) The rolling of the substance becomes more violent as the substance approaches the outlet of the machine, i. e. when it has already reached a certain degree of homogeneity by the action of the threads of one screw against the threads of the other screw and by the action of the edge of the threads—which is very wide—on the core of the screws. This peculiarity provides a more efficient use of the mechanical effect.

(c) Finally, since the heat is transmitted to the mass by the casing in which the screws rotate, said heat reaches the mass more easily owing to the larger area of contact between the screws and the casing and to the good heat conductivity of the screws. Consequently, the paste receives heat just as easily from the casing as from the screws, and in this manner a perfect homogeneity of the paste is obtained in a very short period of operation.

It is obvious that, on the basis of the same process, it is possible to construct screws with two or even more threads of increasing thickness as hereinbefore stated.

It is also possible, in order to increase the compression of the substance inside the machine, and in the case of multiple thread screws, to determine the beginning of the threads with a certain staggered relation.

Thus, for example, the screws near the inlet opening may only have a single thread; a little further along, the screws may have a second thread; further along still there may be four threads and so forth.

I claim:

1. Extruding device intended for shaping plastic and the like comprising a casing, a member for propelling, malaxing, rolling and compressing the substance, rotating in said casing, said member comprising at least one screw, the thread of which has two opposite helical surfaces of constant and different pitch whereby the perpendicular distance between said surfaces increases in the direction of feed of the substance inside the casing, decreasing at the same time the volume between the threads.

2. Extruding device intended for shaping plastic and the like comprising a casing, a member for propelling, malaxing, rolling and compressing the substance rotating in said casing, said member comprising at least two screws adapted to fit into one another and to rotate in pairs, each of said screws having a thread whose two opposite helical surfaces have constant and different pitch whereby the perpendicular distance between said surfaces increases in the direction of the feed of the substance inside the casing.

3. Extruding device intended for shaping plastic and the like comprising a casing, a member for propelling, malaxing, rolling and compressing the substance rotating in said casing, said member comprising at least two screws adapted to fit into one another and to rotate in pairs, each of said screws having a thread whose two opposite helical surfaces have constant and different pitch whereby the perpendicular distance between said surfaces increases in the direction of the feed of the substance inside the casing, and the pitch of one of said surfaces on the thread of each of the two engaging screws is the same.

4. Extruding device intended for shaping plastic and the like comprising a casing, a member for propelling, malaxing, rolling and compressing the substance rotating in said casing, said member comprising at least two screws adapted to fit into one another and to rotate in pairs, each of said screws having a thread whose two opposite helical surfaces have constant and different pitch whereby the perpendicular distance between said surfaces increases in the direction of the feed of the substance inside the casing, the number of threads of each screw increases from the inlet towards the outlet of the casing.

5. An extruding screw comprising a thread having two opposite helical surfaces, the pitch of each surface being constant and different from each other.

6. In an extruding device for shaping a plastic material having a casing and at least one screw inside said casing, the improvement comprising constant but different pitches for the two helical surfaces on opposite sides of the thread of said screw whereby a screw having a thread of increasing thickness and having grooves of decreasing width is obtained which screw propels and compresses said plastic material.

7. The device of claim 3 wherein said surfaces having the same pitch on two separate engaging screws are on the adjacent and engaging sides of the threads of said screws.

GABRIEL CONSALVO.

REFERENCES CITED

The following references are of record in the file of this patent:

UNITED STATES PATENTS

| Number | Name | Date |
|---|---|---|
| 1,677,119 | Kinyon | July 10, 1928 |
| 2,119,162 | Hartner | May 31, 1938 |
| 2,360,984 | Schmitz, Jr. | Oct. 24, 1944 |
| 2,407,503 | Magerkurth et al. | Sept. 10, 1946 |
| 2,411,971 | MacMillin et al. | Dec. 3, 1946 |

FOREIGN PATENTS

| Number | Country | Date |
|---|---|---|
| 863,207 | France | Mar. 27, 1941 |